United States Patent
Garney

(10) Patent No.: US 7,228,406 B2
(45) Date of Patent: Jun. 5, 2007

(54) INTERACTING WITH OPTIONAL READ-ONLY MEMORY

(75) Inventor: John I. Garney, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 529 days.

(21) Appl. No.: 10/326,426

(22) Filed: Dec. 19, 2002

(65) Prior Publication Data

US 2004/0123019 A1    Jun. 24, 2004

(51) Int. Cl.
G06F 1/24      (2006.01)
G06F 9/00      (2006.01)
G06F 9/24      (2006.01)
G06F 9/445     (2006.01)
G06F 15/177    (2006.01)

(52) U.S. Cl. .............................. 713/1; 713/2; 713/100; 717/174

(58) Field of Classification Search .................... 713/1, 713/2, 100
See application file for complete search history.

(56) References Cited

U.S. PATENT DOCUMENTS

| | | | |
|---|---|---|---|
| 5,519,831 A | 5/1996 | Holzhammer | 395/182.2 |
| 5,881,282 A | 3/1999 | Shipman | 395/652 |
| 5,909,592 A * | 6/1999 | Shipman | 710/10 |
| 5,991,643 A * | 11/1999 | Chao-Cheng | 455/575.7 |
| 6,023,758 A * | 2/2000 | Kodama et al. | 712/220 |
| 6,317,827 B1 | 11/2001 | Cooper | 713/2 |
| 6,704,840 B2 * | 3/2004 | Nalawadi et al. | 711/118 |
| 6,907,597 B1 * | 6/2005 | Mamona et al. | 717/121 |
| 6,961,791 B2 * | 11/2005 | Cepulis | 710/104 |
| 6,978,018 B2 * | 12/2005 | Zimmer | 380/30 |
| 2001/0001875 A1* | 5/2001 | Hirsch | 713/1 |
| 2003/0172372 A1* | 9/2003 | Crisan et al. | 717/170 |
| 2004/0249992 A1* | 12/2004 | Komarla et al. | 710/8 |

* cited by examiner

Primary Examiner—Rehana Perveen
Assistant Examiner—Michael J. Brown
(74) Attorney, Agent, or Firm—Trop, Pruner & Hu, P.C.

(57) ABSTRACT

In one embodiment, the present invention includes a method to select a desired configuration parameter for an option read-only memory (ROM) coupled to a system; obtain a code module corresponding to the desired configuration parameter; and provide the code module to the option ROM to dynamically change a portion of code stored in the option ROM. More so, in certain embodiments the present invention permits an option ROM to monitor disk requests in a pre-boot environment.

25 Claims, 4 Drawing Sheets

INTERACTING WITH OPTIONAL READ-ONLY MEMORY

BACKGROUND

The present invention relates to operation of a computer system, and more particularly to operation of such a system having add-in devices.

Many computer systems have one or more "add-in" devices to provide desired functional features. Add-in devices include such devices as video capture devices, communications devices, and disk caches, for example. Such add-in devices typically include optional read-only memories (ROMs) (option ROM's) having embedded control software stored therein. Typically, the control software of an add-in device includes an initialization task for configuring the add-in device. Generally, the contents of the option ROM's of the add-in devices are fixed upon manufacture, although certain add-in devices allow the contents to be completely updated in the field (e.g., while located in a system) to fix so-called "bugs."

However, there is no ability for a portion of the contents of the option ROM to be dynamically changed to allow for support and compatibility of the add-in device with the associated computer system or other such device.

More so, in systems having a disk cache provided on an add-in device with an option ROM, it is typically difficult for the option ROM to connect in with and monitor disk requests in a pre-boot environment. As such, cache coherency cannot be maintained. Thus there is a need to permit an option ROM associated with a disk cache to monitor disk requests in a pre-boot environment.

DETAILED DESCRIPTION

In one embodiment, the present invention may be used to provide a code module to an option ROM installed in a computer system to update a portion of the code within the option ROM. As used herein, the term "computer system" may refer to any type of processor-based system, such as a desktop computer, a laptop computer, a server computer, an appliance or set-top box, wireless device, or the like.

Figure 1:
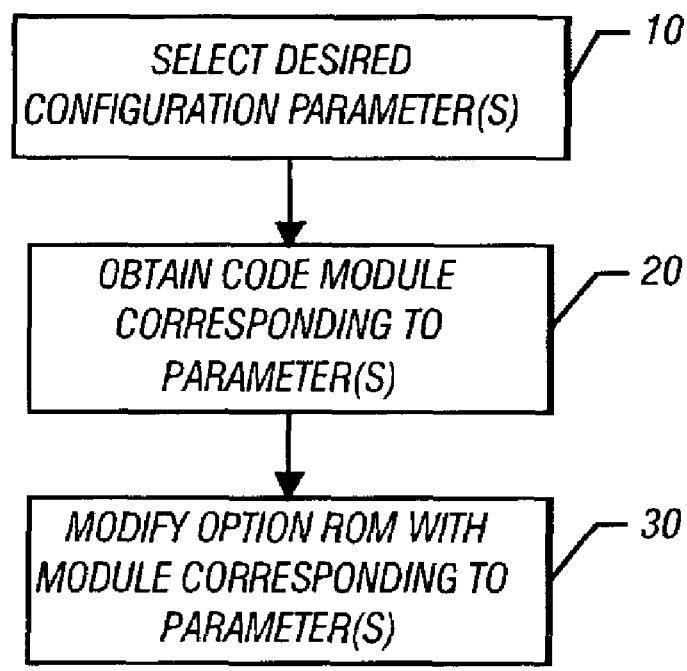
FIG. 1 is a flow diagram of an example program flow in accordance with one embodiment of the present invention.

FIG. 1 is a flow diagram of an example program flow in accordance with one embodiment of the present invention. As shown in FIG. 1, a desired configuration parameter(s) for a component or device (or software) of the computer system may be selected (block 10). In one embodiment, a user may select the configuration parameter, while in other embodiments, the parameter may be automatically selected. Next, a code module that corresponds to the desired parameter(s) may be obtained (block 20). This code module may be driver specific code or another code module that is encoded with instructions that enable the add-in device to operate in accordance with the desired parameter(s).

In one embodiment, this code module may be resident in the computer system, for example, as part or all of a device driver, such as an operating system (OS) driver. In other embodiments, the code module may be resident on a computer readable medium such as an installation disk (e.g., a diskette or compact disk read-only memory (CD-ROM)) provided with the add-in device. Alternately, the code module may be downloaded to the computer system from another source, such as via the Internet.

Next, the option ROM is modified with the code module (block 30). In one embodiment, the modification or upgrade of the option ROM may be performed via an installation program (or a device driver) as part of configuration of the add-in device. Alternately, the modification may be performed to dynamically reconfigure the option ROM when a change has been made to a desired configuration parameter (or for another reason). It is to be understood that via the modification process, a portion of the code within the option ROM is replaced with the code module. In such manner, part of the contents of the option ROM may be dynamically changed.

Figure 2:
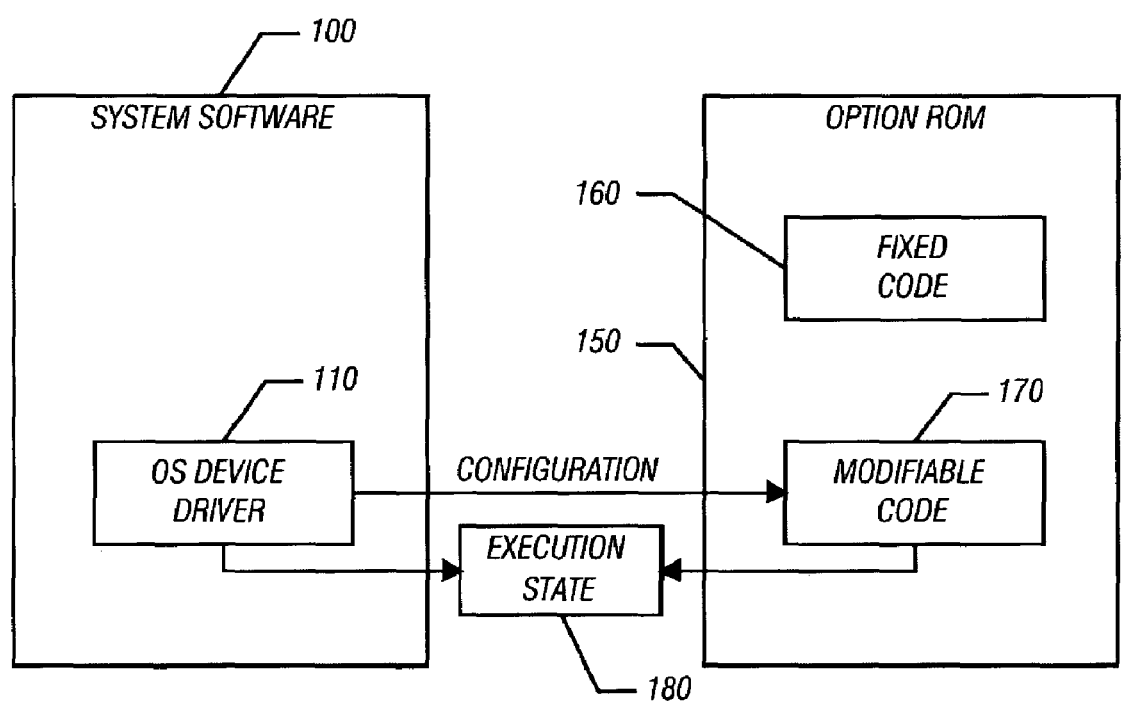
FIG. 2 is a block diagram of system software and an option ROM in accordance with one embodiment of the present invention.

Referring now to FIG. 2, shown is a block diagram of an option ROM and system software in accordance with one embodiment of the present invention. As shown in FIG. 2, system software 100 includes an OS device driver 110. Of course it is to be understood that system software 100 includes many other components, such as an operating system kernel, Basic Input/Output System (BIOS), and the like. Option ROM 150 may be included in an add-in device present in the system. As shown in FIG. 2, option ROM 150 includes a fixed code portion 160 and a modifiable code portion 170. In one embodiment, option ROM 150 may be a non-volatile storage device, for example a flash memory device. It is to be understood that both fixed code portion 160 and modifiable code portion 170 may be included in the non-volatile device. In one embodiment, fixed code portion 160 may correspond to BIOS or other firmware low-level code that is not directly impacted by the desired configuration parameter(s), while the modifiable code portion 170 may correspond to such code that is impacted by the desired configuration parameter(s). It is to be understood that modifiable code portion 170 and OS device driver 110 may also have code that while different, corresponds and supports the desired configuration parameter(s), although in certain embodiments this code may be identical.

As shown in FIG. 2, in one embodiment OS device driver 110 may provide the desired code module to option ROM 150 during a configuration process. More specifically, OS device driver 110 may provide the code module to the modifiable code portion 170 and replace its contents with the new code module. Also shown in FIG. 2 is an execution state 180 of the computer system. In this execution state 180, modifiable code portion 170 includes code that is equivalent to the code in OS device driver 110. In other words, both OS device driver 110 and modifiable code portion 170 include code that corresponds to and supports the desired configuration parameter(s).

Figure 3:
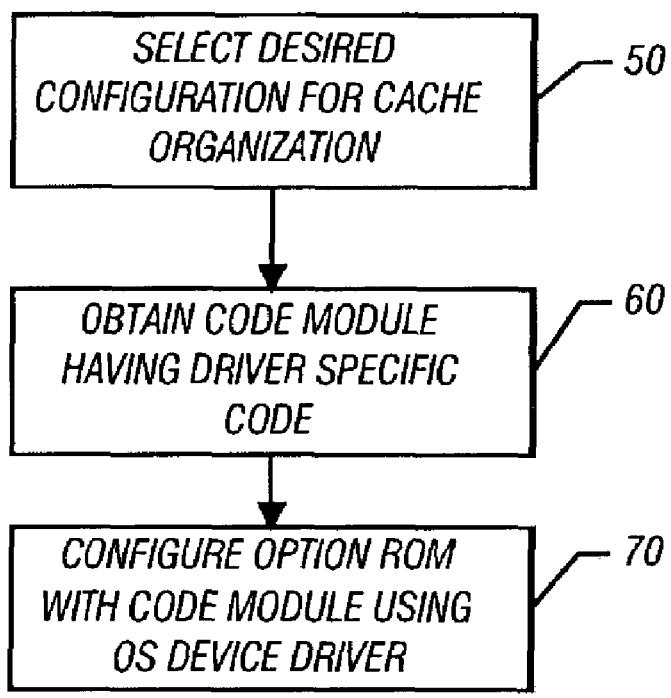
FIG. 3 is a flow diagram of an example program flow in accordance with one embodiment of the present invention for use in an add-in device for a disk cache.

Referring now to FIG. 3, shown is a flow diagram of an example program flow in accordance with an embodiment of the present invention as used in an add-in device for a disk cache. In such an add-in device, an option ROM is typically present and includes code to support access to the cache before an OS specific device driver for the cache is loaded.

As shown in FIG. 3, a desired configuration for organization of the cache is selected (block 50). There may be many different choices for how to organize the cache (e.g., four-way set associative, direct mapped, and the like). Each organization may require different associated code to access data or metadata in the cache. As discussed above, the selection of the desired configuration may be done automatically as part of an installation process or may be done by a user.

Next, a code module having driver specific code that corresponds to the desired cache organization scheme may be obtained (block 60). In one embodiment, this code module may execute as part of BIOS (which has significant restrictions compared to an OS specific device driver). Further, this code module may correspond to the (more extensive) cache control logic of the OS specific device driver. Since the BIOS code must be smaller in size and therefore simpler in functionality, a simple set of interfaces may be used to allow the BIOS code that is not dependent on the cache policy details to be unaffected by using different cache policy modules. For example interface functions such as: Locate_diskID_table( ); Convert_to_diskID (diskinfo_ptr, diskID_table_ptr); Get_cache_entry_state_size( ); Get_cacheline_size( ); Locate_cacheline_state (diskID, disk_LBA); Is_hit(cache_state_ptr, diskID, disk_LBA, read_or_write); Locate_data(diskID, disk_LBA); and Invalidate(cache_state_ptr, diskID, disk_LBA), are not affected by using different cache policy code modules. In certain embodiments, the cache policy module (e.g., modifiable code portion 170) may support these functions to allow the option ROM fixed code portion 160 to support disk read and write accesses to the cache until the full device driver loads.

Next, the option ROM is modified with the code module (block 70). In one embodiment, the modification may be performed via an OS device driver, for example, as part of configuration of the add-in device. In such manner, a desired cache policy may be selected by the system or a user and corresponding support for that policy may be installed in the option ROM.

Thus in certain embodiments, code within the option ROM may be modified in the field without having to exchange option ROM's or add-in devices themselves. In one embodiment, selection of a specific cache algorithm (for example, for use in a write back cache) may be permitted, and code (e.g., driver specific code) to support the algorithm may be provided to the option ROM in the field.

In embodiments in which an add-in device includes a disk cache for a boot disk (but not the boot disk), it may be necessary for an option ROM on the add-in device to monitor disk traffic requested via system BIOS (for a motherboard supported boot disk) or an add-in device disk controller (via its own option ROM). To do so, in certain embodiments, code may be provided in the option ROM to permit the cache option ROM to connect into a pre-boot execution environment. Such a pre-boot environment may take various forms. In one embodiment, the pre-boot environment may be system startup BIOS. Alternately, the pre-boot environment may implement other firmware, such as Extensible Firmware Interface (EFI) compliant firmware (as set forth in the Extensible Firmware Interface (EFI) Specification, version 1.02, published Dec. 12, 2000, by Intel Corporation, Santa Clara, Calif.), Open Firmware (in accordance with the IEEE 1275 standard, IEEE std. 1275-1994, published 1994), and the like.

Figure 4:
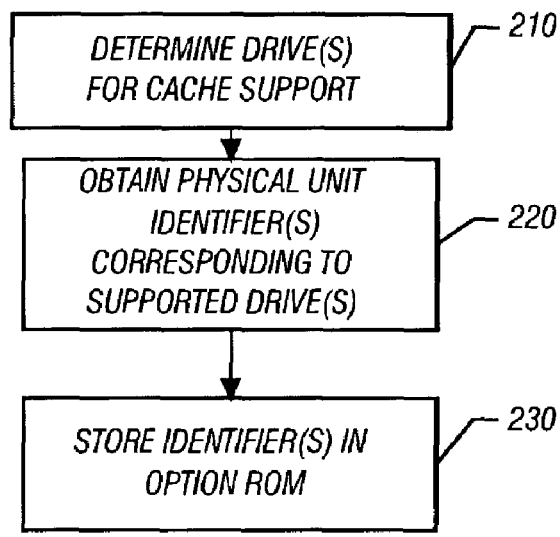
FIG. 4 is a flow diagram of initializing an option ROM in accordance with one embodiment of the present invention.

Referring now to FIG. 4 shown is a flow diagram of an example program flow in accordance with one embodiment of the present invention. This program may initialize the cache. As shown in FIG. 4, it is first determined what drive or drives are to be supported by the cache (block 210). Next, physical unit identifiers corresponding to the supporting drives are obtained (block 220). These identifiers are then stored in the option ROM (block 230). In such manner, the option ROM may be configured to connect into a pre-boot environment.

In addition, a global BIOS variable indicating the number of drives present may be incremented. Typically, BIOS uses software interrupt int13H to initiate disk access code, such as for handling disk read and write operations. The existing interrupt vector for performing disk accesses (e.g., int13H) may be replaced with an address of a runtime entry point of code in the option ROM. Thus, in this initialization process the existing interrupt vector for the BIOS interrupt for performing disk accesses may be replaced with a vector pointing to an address within the option ROM.

In a pre-boot environment, such as BIOS, setup choices may permit the option ROM to be selected by the user as the primary boot drive and the real drive (i.e., the cached drive) as a second boot drive. Then when the runtime entry point in the option ROM is called, the cached boot drive parameter (e.g., 80H) may be changed to be the second real drive (e.g., 81H). In such manner, the real boot disk in a pre-boot environment may handle the disk request and allow a normal system boot while the disk cache option ROM can monitor requests to the cached boot drive.

Figure 5:
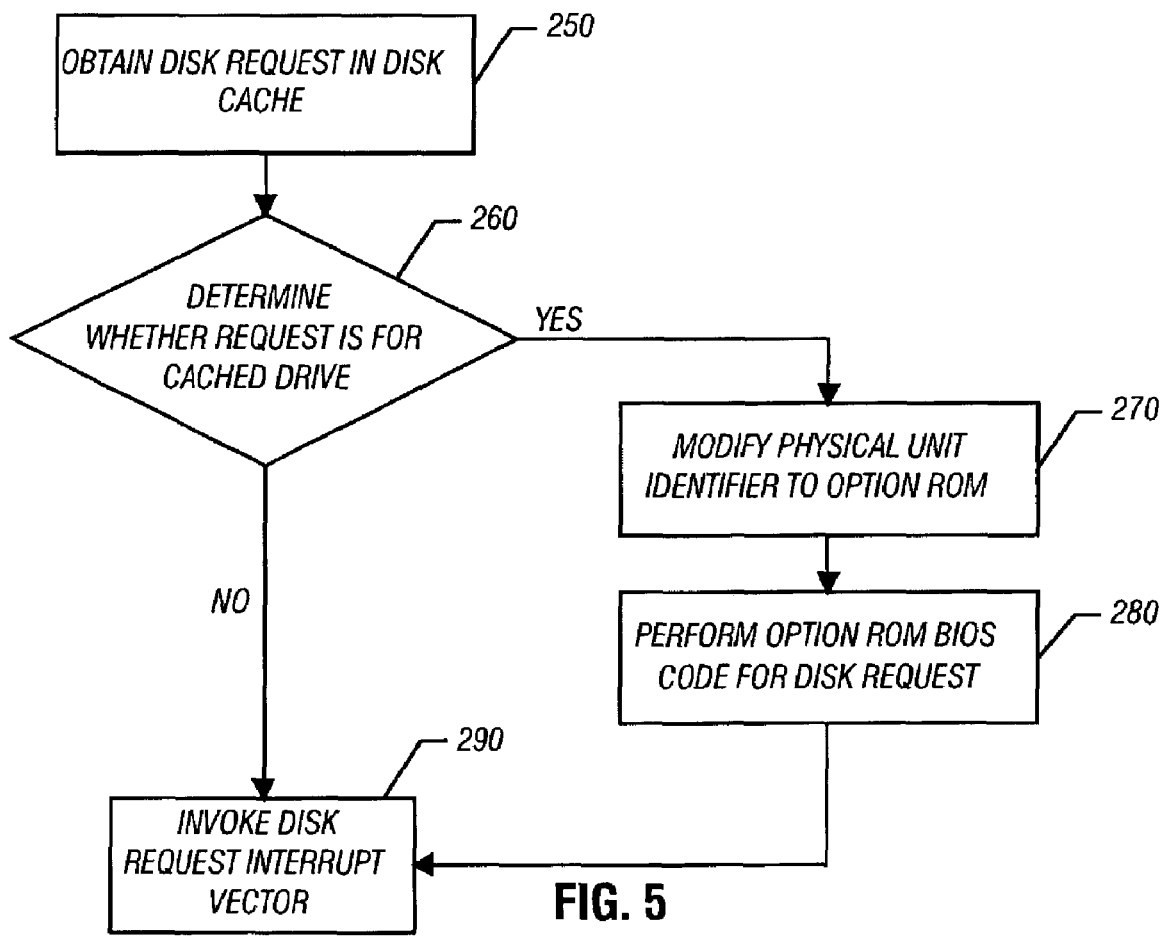
FIG. 5 is a flow diagram of operation of a system having an option ROM in accordance with one embodiment of the present invention.

Referring now to FIG. 5, shown is a flow diagram of operation of a system having an option ROM to monitor disk traffic in a pre-boot environment in accordance with one embodiment of the present invention. As shown in FIG. 5, disk requests are obtained in the disk cache (block 250). It is then determined whether the disk request is for a drive supported by the disk cache (diamond 260). If the disk request is for a supported drive, a physical unit identifier for the boot drive which is being cached is modified and replaced with the physical unit identifier for the real (i.e., secondary) drive (block 270). Then option ROM BIOS code is performed to monitor and respond to the disk request (block 280). Responding to the disk request may include providing or writing data from or to the cache if the desired memory location is within a cache range. Alternately if the memory location is out of the cache range, data may be obtained or written to the real (i.e., secondary) drive itself.

Finally, after the BIOS code for the option ROM is performed or if the disk request is not for a cached drive, the standard disk request interrupt vector (e.g., int13H) is invoked (block 290). At this point, the standard interrupt request vector is accessed and the standard disk request interrupt routine is run.

In such manner, the option ROM may monitor pre-boot disk requests for a boot disk, and permit pre-boot support for the real boot disk, which may handle the interrupt request and perform a normal boot. In certain embodiments, when the cache runtime entry is called (e.g., beginning the program flow at block 250), any desired processing may be performed before or after the standard interrupt vector is invoked to perform the desired monitoring function.

Thus the reinvocation of the standard disk request interrupt vector permits the option ROM to connect to the desired boot code. In contrast, invoking the entry point of the interrupt vector that an option ROM found during its initialization routine would not connect to the desired boot code. This is because modern system BIOS carefully constructs the chain of code for the standard disk interrupt vector and the second boot drive code may be located earlier in the call chain (before the so-called "filter" code).

By monitoring disk requests in a pre-boot environment using the option ROM, the cache option ROM may maintain coherency during disk requests. For example, BIOS boot time disk requests may be monitored to keep the option ROM coherent during BIOS disk requests (e.g., before an OS specific device driver can be loaded to manage the cache). In one embodiment, the present invention may be used in connection with an add-in device coupled to a Peripheral Component Interconnect (PCI) bus that cannot modify system BIOS code.

Embodiments may be implemented in a computer program. As such, these embodiments may be stored on a storage medium having stored thereon instructions which can be used to program a computer system to perform the embodiments. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs), erasable programmable read-only memories (EPROMs), electrically erasable programmable read-only memories (EEPROMs), flash memories, magnetic or optical cards, or any type of media suitable for storing electronic instructions. Similarly, embodiments may be implemented as software modules executed by a programmable control device. A programmable control device may be a computer processor or a custom designed state machine. Custom designed state machines may be embodied in a hardware device such as a printed circuit board having discrete logic, integrated circuits, or specially designed application specific integrated circuits (ASICs).

Figure 6:
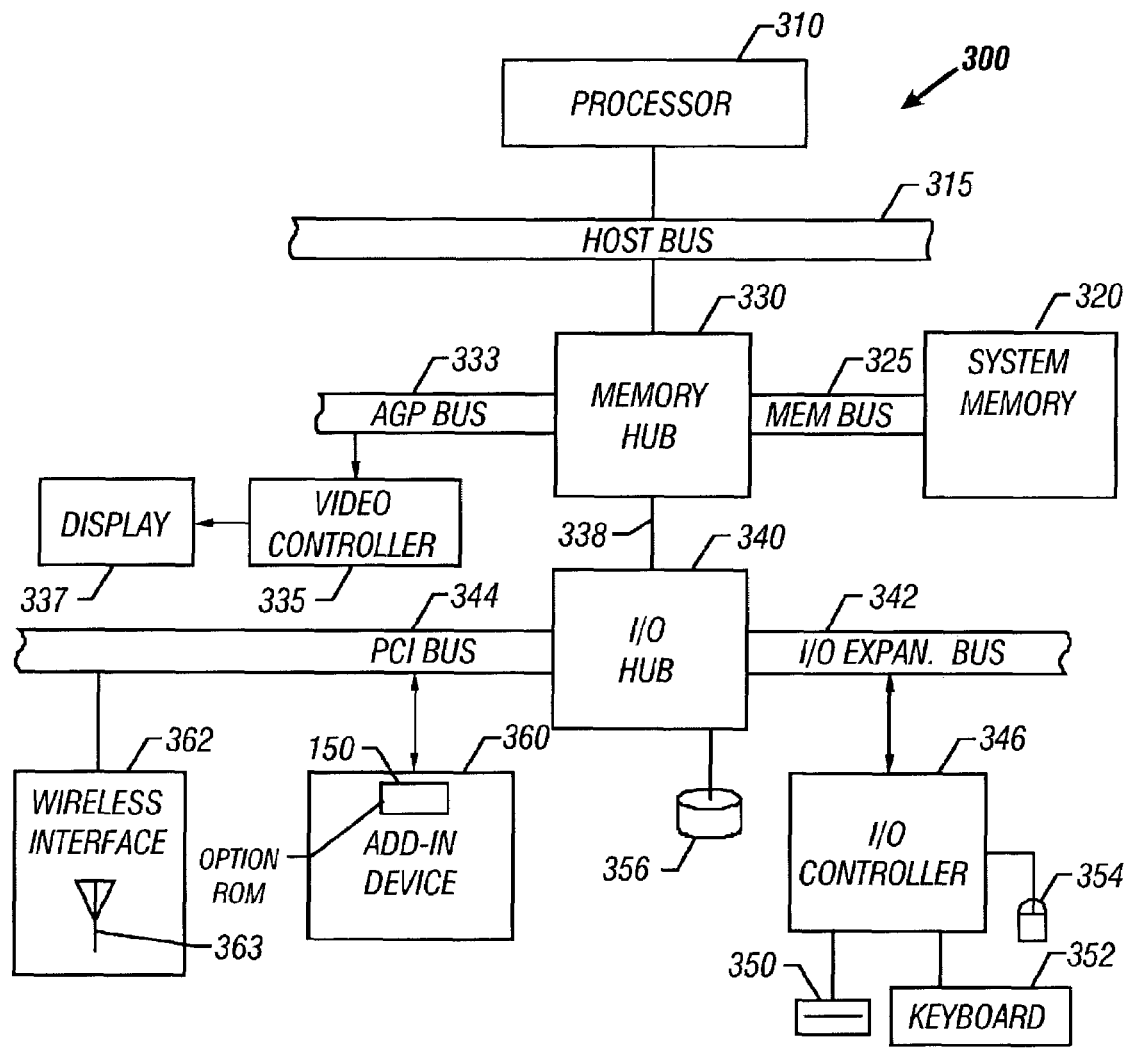
FIG. 6 is a block diagram of a system in accordance with one embodiment of the present invention.

FIG. 6 is a block diagram of a representative data processing system, namely computer system 300 with which embodiments of the invention may be used. In one embodiment, computer system 300 includes a processor 310, which may include a general-purpose or special-purpose processor such as a microprocessor, microcontroller, ASIC, a programmable gate array (PGA), and the like.

The processor 310 may be coupled over a host bus 315 to a memory hub 330 in one embodiment, which may be coupled to a system memory 320 via a memory bus 325. The memory hub 330 may also be coupled over an Advanced Graphics Port (AGP) bus 333 to a video controller 335, which may be coupled to a display 337. The AGP bus 333 may conform to the Accelerated Graphics Port Interface Specification, Revision 2.0, published May 4, 1998, by Intel Corporation, Santa Clara, Calif.

The memory hub 330 may also be coupled (via a hub link 338) to an input/output (I/O) hub 340 that is coupled to a input/output (I/O) expansion bus 342 and a Peripheral Component Interconnect (PCI) bus 344, as defined by the PCI Local Bus Specification, Production Version, Revision 2.1 dated in June 1995. The I/O expansion bus 342 may be coupled to an I/O controller 346 that controls access to one or more I/O devices. As shown in FIG. 6, these devices may include in one embodiment storage devices, such as a floppy disk drive 350 and input devices, such as keyboard 352 and mouse 354. The I/O hub 340 may also be coupled to, for example, a hard disk drive 356 as shown in FIG. 6. It is to be understood that other storage media may also be included in the system. In an alternate embodiment, the I/O controller 346 may be integrated into the I/O hub 340, as may other control functions.

The PCI bus 344 may be coupled to various components including, for example, an add-in device 360. In embodiments of the present invention, add-in device 360 may be a disk cache and may include an option ROM 150. Further shown in FIG. 6 is a wireless interface 362 coupled to the PCI bus 344, which may be used in certain embodiments to communicate with other devices. As shown in FIG. 6, wireless interface 362 may include a dipole antenna 363 (along with other components not shown in FIG. 6).

Additional devices may be coupled to the I/O expansion bus 342 and the PCI bus 344, such as an input/output control circuit coupled to a parallel port, serial port, a non-volatile memory, and the like. Although the description makes reference to specific components of the system 300, it is contemplated that numerous modifications and variations of the described and illustrated embodiments may be possible.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   selecting a desired configuration parameter for an option read-only memory (ROM) of an add-in device coupled to a system responsive to a user selection of a desired cache organization scheme for a disk cache of the add-in device;
   obtaining a code module corresponding to the desired configuration parameter; and
   providing the code module to the option ROM to dynamically change a portion of code stored in the option ROM.

2. The method of claim 1, further comprising using an operating system device driver to provide the code module to the option ROM.

3. The method of claim 2, further comprising dynamically changing the portion of code stored in the option ROM so that the operating system device driver and the code module include equivalent code.

4. The method of claim 1, further comprising using an installation program to provide the code module to the option ROM.

5. The method of claim 1, further comprising maintaining a second portion of code stored in the option ROM unchanged.

6. The method of claim 5, wherein the second portion of code comprises low-level code unimpacted by the desired configuration parameter.

7. The method of claim 1, further comprising supporting disk accesses to the disk cache via the code module while in a pre-boot execution environment.

8. A method comprising:
   selecting a desired cache organization scheme for a cache memory;
   transmitting a code module to an option read-only memory (ROM) associated with the cache memory, the code module provided being dependent on the desired cache organization scheme and corresponding to operating system (OS) driver code to allow access to the cache memory via the code module and a second code module present in the option ROM prior to loading of the OS driver code; and
   storing the code module in the option ROM.

9. The method of claim 8, wherein storing the code module comprises storing a cache policy module.

10. The method of claim 8, further comprising permitting a user to select the desired cache organization scheme.

11. The method of claim 8, further comprising storing the code module in a modifiable code portion of the option ROM.

12. The method of claim 8, further comprising transmitting the code module to the option ROM using a device driver.

13. The method of claim 8, wherein storing the code module in the option ROM comprising storing the code module in basic input/output system (BIOS) of the option ROM.

14. An article comprising a machine-readable storage medium containing instructions that if executed enable a system to:
   select a desired configuration parameter for an option read-only memory (ROM) of an add-in device coupled to the system responsive to a user selection of a desired cache organization scheme for a disk cache of the add-in device;
   obtain a code module corresponding to the desired configuration parameter; and
   replace a code portion stored in the option ROM with the code module to dynamically change the option ROM.

15. The article of claim 14, further comprising instructions that if executed enable the system to use an operating system device driver to provide the code module to the option ROM.

16. A system comprising:
   at least one storage device containing instructions that if executed enable the system to select a desired configuration parameter for an option read-only memory (ROM) of an add-in device including a disk cache, obtain a code module corresponding to the desired configuration parameter, and provide the code module to the option ROM to dynamically change a portion of code stored in the option ROM;
   a processor coupled to the at least one storage device to execute the instructions; and
   a dipole antenna coupled to the processor.

17. The system of claim 16, wherein the option ROM comprises a fixed code portion and a modifiable code portion.

18. The system of claim 17, wherein the modifiable code portion comprises Basic Input/Output System (BIOS).

19. The system of claim 16, further comprising instructions that if executed enable the system to select a desired cache organization scheme for the disk cache.

20. The system of claim 16, further comprising instructions that if executed enable the system to use an operating system device driver to provide the code module to the option ROM.

21. The system of claim 16, wherein the option ROM comprises a non-volatile memory.

22. The system of claim 16, wherein the option ROM includes code to support the disk cache in a pre-boot execution environment.

23. A method comprising:
   receiving and storing a first code module corresponding to a configuration parameter for an option read-only memory (ROM) responsive to a user selection of a cache organization scheme for a disk cache associated with the option ROM; and
   executing the first code module with a second code module of the option ROM to support access to the disk cache before an operating system driver for the disk cache is loaded.

24. The method of claim 23, wherein storing the first code module dynamically changes a portion of code stored in the option ROM.

25. The method of claim 23, wherein the second code module includes code that is not affected by the selected cache organization scheme.

* * * * *